AUTOMATIC SPEED CONTROL MECHANISM FOR PHONOGRAPHS

Filed Feb. 12, 1960 2 Sheets-Sheet 1

INVENTORS:
MAHLON W. KENNEY
JACOB C. KIEFER
BY [signature]
Atty.

AUTOMATIC SPEED CONTROL MECHANISM FOR PHONOGRAPHS

Filed Feb. 12, 1960

2 Sheets-Sheet 2

INVENTORS:
MAHLON W. KENNEY
JACOB C. KIEFER
BY

United States Patent Office 3,034,792
Patented May 15, 1962

3,034,792
AUTOMATIC SPEED CONTROL MECHANISM FOR PHONOGRAPHS

Mahlon W. Kenney, Oak Park, and Jacob C. Kiefer, Chicago, Ill., assignors to The Seeburg Corporation, Chicago, Ill., a corporation of Pennsylvania Filed Feb. 12, 1960, Ser. No. 8,280
11 Claims. (Cl. 274—10)

This invention relates generally to apparatus for automatically changing the speed of a phonograph turntable in accordance with the type of record to be played thereon whereby, for example, 33⅓ r.p.m. and 45 r.p.m. records can be intermixed in any combination in the record magazine of an automatic phonograph and each will be played at its proper turntable speed.

More specifically, our invention relates to apparatus of this type which senses the size of the center hole of the record to be played and determines the speed of the phonograph turntable in accordance with the size of the hole in the selected record.

The records most commonly employed with automatic phonographs are of the type which are adapted to be reproduced at 45 r.p.m. and which have a record center hole diameter of approximately 1.504 inches. Records adapted to be played at other speeds, such as at 33⅓ r.p.m., are being produced but the automatic phonographs now on the market are designed to reproduce records at one speed only and thus 33⅓ r.p.m. records cannot be intermixed with 45 r.p.m. records and either type played on the same machine. The 33⅓ r.p.m. records now in use have a center hole diameter of approximately 0.286 inch.

One of the objects of this invention is, therefore, to provide apparatus for automatically sensing the size of the center hole of the record next to be played and for determining the speed of the phonograph turntable in accordance therewith.

Another of our objects is to provide apparatus of this type including such a size-sensing member which is adapted to rest in one of two positions depending upon the center hole diameter of the record next to be played whereby the speed of the phonograph turntable can be controlled in accordance with the position of the member.

A further object of the invention is to provide apparatus of this type which is inexpensive to produce and which is simple and dependable in operation.

These and other objects and advantages of the invention will be apparent from the following description thereof, taken in conjunction with the accompanying drawings in which.

As previously stated, records of the type adapted to be reproduced at 33⅓ r.p.m. have a center hole diameter of approximately 0.286 inch and records of the type adapted to be reproduced at 45 r.p.m. have a center hole diameter of approximately 1.504 inches. An important feature of the present invention is the use of a size sensing member adapted to cooperate with the center hole of a record to be played. According to the invention, such member may comprise a stepped clamping disc having two (or there could be more) record engaging surfaces thereon, an outer one (in the embodiment shown) for engaging and clamping 45 r.p.m. records and an inner one, formed on a reduced portion of the disc, for engaging and clamping 33⅓ r.p.m. records. When a 45 r.p.m. record is presented, said reduced portion of the disc will pass through the larger center hole of the record and said outer record engaging surface will bear against the face of the record and clamp the record to the turntable. When a 33⅓ r.p.m. record is presented, such reduced portion of the disc cannot pass through the smaller center hole and the record engaging surface thereon will therefore engage the record and clamp it to the turntable.

Consequently, when the sensing member is brought into cooperative relation with the record to be played, said member will assume one of two positions depending upon the size of the record center hole. The speed of the phonograph turntable is then determined in accordance with the position of the size-sensing member, as will be more fully explained hereinafter.

A preferred embodiment of the invention will now be specifically described in conjunction with a phonograph of the type adapted to reproduce a record which is supported in a vertical playing position. In this embodiment a record clamp arm having a clamp disc mounted thereon is shown for clamping a record to the phonograph turntable and said clamp disc is formed to serve as the size sensing member.

Figure 1:
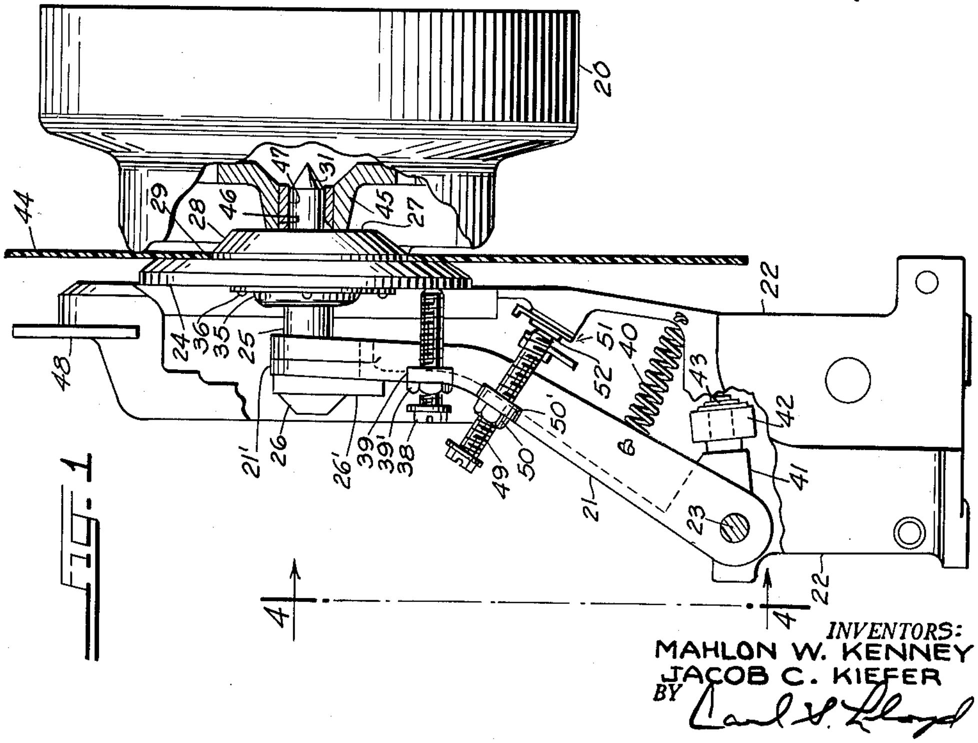
FIG. 1 is a side elevational view, partly broken away, illustrating a phonograph turntable and a record clamp arm and disc assembly in which our invention is embodied, said arm being shown in position for clamping a 45 r.p.m. record to the turntable.

Referring first to FIG. 1, a turntable 20 is arranged to be driven by the usual phonograph motor (shown at 53 in FIG. 5) whereby a record clamped thereto will be played while positioned in a vertical plane. A clamp arm 21 is pivotally mounted upon a frame 22 by means of a pin 23 and said arm is adapted to be pivoted towards the turntable 20 so as to clamp a record thereto. A record clamp disc 24 is mounted on the clamp arm 21 by means of a pin 25 and a block 26.

Figure 3:
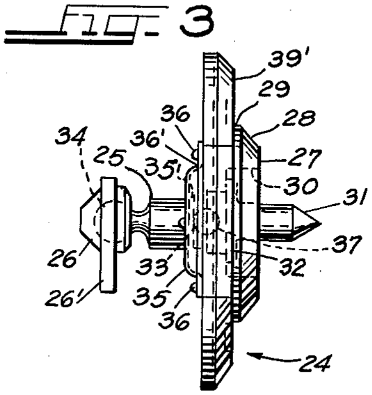
FIG. 3 is a side elevational view illustrating the clamp disc shown in FIGS. 1 and 2.

Referring to FIG. 3, it will be noted that the clamp disc 24 is provided with a circumferential shoulder 27 having a sloping portion 28 and outer periphery 29. A recess 30 is, or may be, formed within the shoulder 27 and a record centering pin 31 having a conical shape at its forward end extends through the disc 24 and has a flat mounting portion 32 located at the base of said recess 30, said pin being affixed to the disc by riveting or in any suitable manner.

The pin 25 carries a ball 33 at one end thereof and has a substantially ball-shaped extension 34 at its other end. A disc cover 35 is positioned on the pin 25 and a split retainer 35′ is mounted in a groove (not shown) in the pin so as to prevent the cover from sliding longitudinally thereon while allowing some play so that the disc 24, to which it is attached, can pivot slightly on the pin 25 in any direction. The disc cover 35 is fixedly mounted to the back of the disc 24 by means of screws 36 which pass through a flange 36′ on said cover. In this manner, the pin 25 is connected to the disc 24 by a universal joint, the ball 33 being positioned within a conical recess 37 in the rear end of the pin 31 which is carried by said disc. The block 26 is mounted on the ball-shaped end 34 of the pin 25 in such manner as to provide a second universal joint, both of said joints being for the purpose of permitting proper positioning of the disc 24 and centering pin 31 during the clamping of a record to the turntable.

Figure 4:
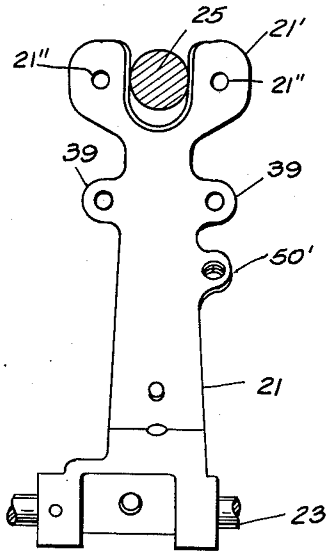
FIG. 4 is an elevational view of the clamp arm taken along the line 4—4 of FIG. 1.

Referring next to FIG. 4, the clamp disc 24 is mounted on the upper end of the clamp arm 21 by connecting a flange 26′ on the block 26 to a pair of mounting arms 21′ on the clamp arm 21. A pair of mounting holes 21″ are provided in the mounting arms for this purpose and the flange 26′ may be connected to said arms by any suitable means.

When the clamp arm 21 is pivoted away from the turntable 20, the position of the clamp disc 24 may be adjusted by adjusting screws 38. The screws 38 are threaded through lugs 39 on the arm 21 (see FIGS. 1, 2 and 4) and said screws engage the lower end of the clamp disc 24 on each side thereof. The position of the disc 24 can thus be adjusted by these screws so as to assure that it will be in proper alignment with the center hole of a record to be clamped, and said screws can be locked in their desired position by means of lock nuts 39′.

When a 33⅓ r.p.m. record is clamped to the turntable 20, the centering pin 31 projects through the record center hole (so as to serve, in effect, as a spindle), said hole being slightly larger than said pin, and the circumferential shoulder 27 (see FIG. 3) bears against the face of the record. However, when a 45 r.p.m. record is clamped to said turntable the shoulder 27, which has a periphery 29 that is of slightly less diameter than the larger center hole of such a record, projects through such hole and constitutes the spindle for the record. In this case the outer surface, marked 39′, on the clamp disc 24 bears against the face of the record. Consequently, when a 45 r.p.m. record is being played the position of the clamp arm 21 will be as shown in FIG. 1, and when a 33⅓ r.p.m. record is being played the clamp arm will be in the position shown in FIG. 2.

A tension spring 40 (see FIGS. 1 and 2) has one end connected to the clamp arm 21 and the other end connected to the frame 22 so as to bias said arm towards the turntable. The arm 21 has a crank 41 at its lower end (see FIG. 1) and a roller 42 is mounted on said crank by means of a pin 43 and suitable washers. The phonograph mechanism includes a clamp arm control cam (not shown) which is mounted immediately beneath said roller so as to act thereon and control the position of the clamp arm 21. It will be understood that when a 45 r.p.m. record (see 44 in FIG. 1) or a 33⅓ r.p.m. record (see 44′ in FIG. 2) is to be clamped to the turntable 20, said cam frees the roller 42 for downward movement and the spring 40 causes the arm 21 to be pivoted towards said record whereby the arm 21 assumes one of the positions shown in FIGS. 1 and 2, depending upon the type of record being clamped.

The turntable 20 is provided with a center boss 45 and said boss has a hole 46 provided therein, in which a bushing 47 is fitted. In either of the clamp arm positions shown in FIGS. 1 and 2 the conical end of the centering pin 31 will project within the bushing 47 so as to secure the clamp disc 24 and effect proper centering of the record which is to be played.

When a record is to be released, the clamp arm control cam exerts an upward force on the roller 42 and the arm 21 is pivoted away from the turntable 20. Occasionally, the record may tend to remain on the clamp disc 24 and thus a stripper 48 (shown partly broken away in FIGS. 1 and 2) is provided to assure that said record is removed therefrom. The stripper, which forms no part of the present invention, may be integral with the frame 22 and may comprise a ring-shaped member which surrounds the disc 24 whereby when the disc moves to the left through said ring a record carried by said disc will be engaged by the stripper and removed therefrom.

Figures 2, 5:
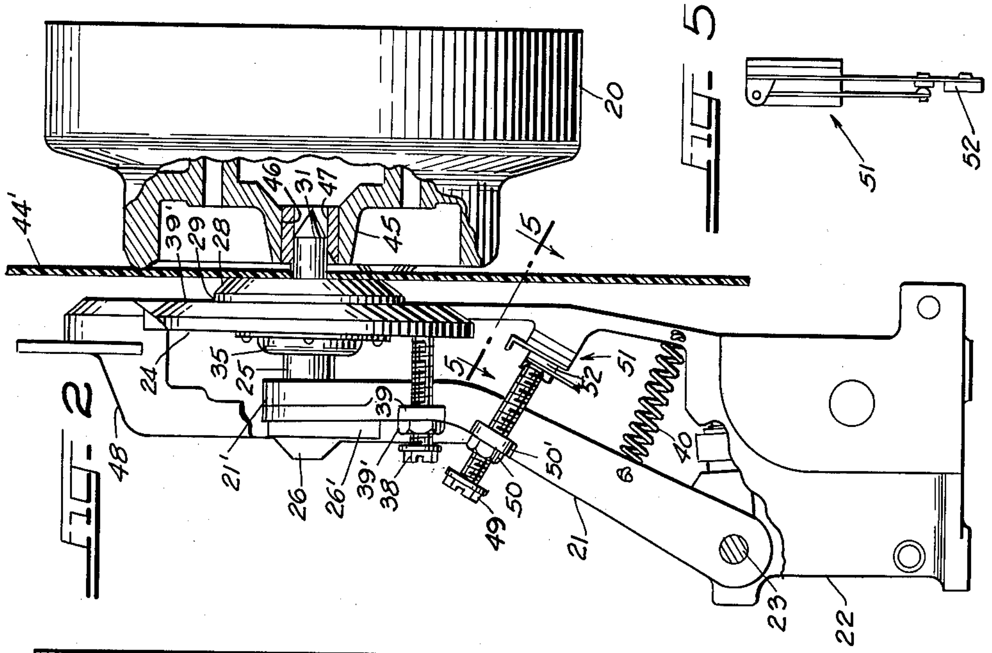
FIG. 2 is a view of the apparatus shown in FIG. 1, illustrating the clamp arm and disc in position for clamping a 33⅓ r.p.m. record to the turntable.
FIG. 5 is a view of a speed control switch taken along the line 5—5 of FIG. 2.

As previously stated, one of the important features of this invention is the use of a hole size sensing member which cooperates with the center hole of a record to be played and assumes one of two positions depending upon the size of said hole. In the embodiment being described the clamp disc 24 comprises such a member and the two positions of said disc and the arm 21 upon which it is mounted are shown in FIGS. 1 and 2, respectively. An important and related feature of the invention is the provision of means to determine the speed of the turntable 20 in accordance with the position of the sensing device and a preferred embodiment of such means will now be described.

Referring again to FIGS. 1, 2 and 4, a screw 49, on which there is a lock nut 50, is threaded through a lug 50′ on the clamp arm 21. A switch 51, having a movable contact arm 52 (see FIG. 5), is mounted on the frame 22 and is arranged to be actuated by the screw 49. When a 33⅓ r.p.m. record is to be played, the screw 49 does not engage the movable contact arm 52 (see FIG. 2) and thus said switch, which is biased to its closed position, will remain closed. However, when a 45 r.p.m. record is clamped to the turntable the actuating screw 49 engages the contact 52 (see FIG. 1) so as to open the switch 51.

Figure 6:
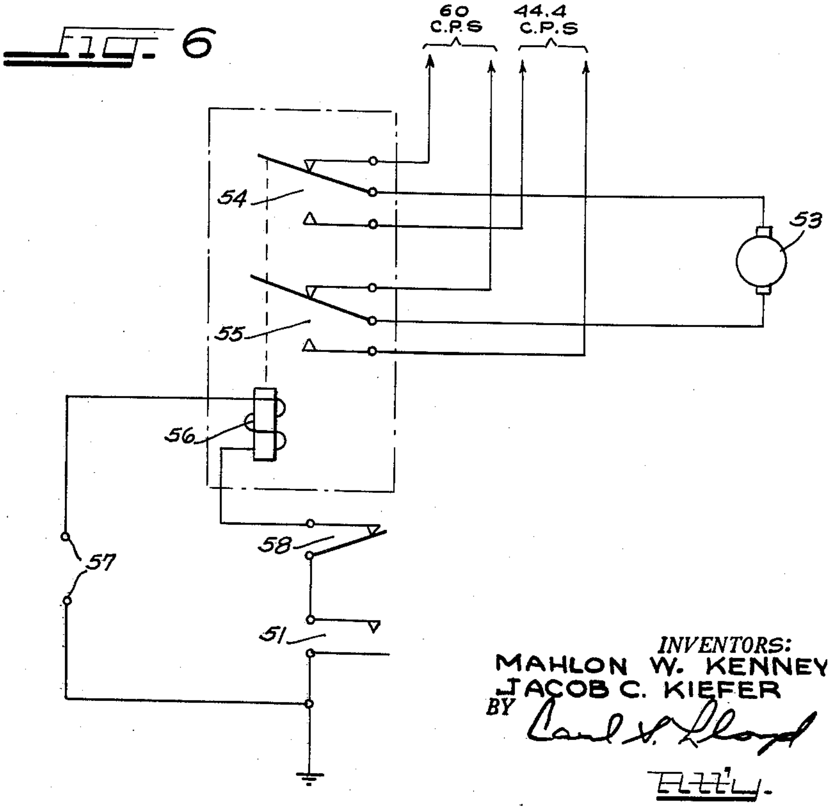
FIG. 6 is a simplified schematic wiring diagram of the basic electrical circuit of the phonograph.

Reference is now made to FIG. 6 which illustrates schematically a phonograph motor 53, the switch 51, and related circuitry. Two sources of power are shown for the phonograph motor 53, one for providing 60 cycle A.C. power and the other for providing 44.4 cycle A.C. power. The 60 cycle A.C. power would, of course, be provided by a standard power source and the 44.4 cycle A.C. power can be provided with an oscillator and amplifier by means well understood in the art.

The motor 53 serves to drive the turntable 20, and the turntable drive mechanism (not shown) is designed so that when said motor is operated on 60 cycle power the turntable speed will be 45 r.p.m. The speed of the A.C. motor 53 is proportional to the frequency of its power source and, consequently, when said motor is operated on 44.4 cycle power the turntable speed will be 33⅓ r.p.m.

Two switches 54 and 55 are provided to connect the motor 53 to one of the two A.C. power sources. A relay 56 serves to operate these switches simultaneously and when said relay is deenergized the switches are both in the position shown in FIG. 6 so that the motor is connected to a 60 cycle power source. When the relay 56 is energized, both of said switches will be moved to their opposite positions so as to connect the motor to the 44.4 cycle power source.

A source of power for the relay 56 is represented by the terminals 57 and, in addition to the switch 51, a switch 58 is provided in the relay circuit. The switch 58 is maintained closed when the phonograph mechanism is in playing position and, consequently, when a record is reproduced the relay 56 will be energized so as to put the motor on 44.4 cycle power when the switch 51 is closed, and said relay will be deenergized so as to put the motor on 60 cycle power when said switch 51 is open.

It will now be understood that when a 33⅓ r.p.m. record is clamped to the turntable 20, the actuating screw 49 will not open the switch 51 and thus the motor will be operated on 44.4 cycle power so as to rotate the turntable at 33⅓ r.p.m. When a 45 r.p.m. record is clamped to said turntable, the actuating screw 49 will engage the contact arm 52 and open the switch 51 so as to put the motor on 60 cycle power and effect rotation of the turntable at 45 r.p.m.

The phonograph mechanism includes a cam (not shown) to operate the switch 58 and said cam is arranged to maintain the switch 58 in closed position when the phonograph mechanism is in playing position and to open said switch only during the change cycle, i.e., when the phonograph mechanism is discharging one record and preparing for the playing of the next.

The purpose of providing the switch 58 in the relay circuit and maintaining said switch in open position during the change cycle is so that the motor 53 will always be operated on 60 cycle power from the primary line during said change cycle and thus will not put a load on the oscillator and amplifier which serve to provide the 44.4 cycle power. The power requirements of the motor are much greater during the change cycle than during the actual playing of a record and by employing the 60 cycle power source to handle such requirements it is possible to provide a less powerful and less expensive source of 44.4 cycle power.

In describing the above embodiment of the invention in conjunction with an automatic phonograph, we have described only certain portions of the phonograph such as the turntable and means for clamping a record thereto. The various other elements of a phonograph such as a record magazine, record transfer mechanism, turntable drive mechanism, tone arm mechanism, and the means for selecting a particular record, etc., may be any one of a number of known types. Consequently, a detailed description of such elements is not deemed necessary to a full understanding of the instant invention.

In the above-described embodiment, the clamp disc 24 served as the hole size sensing member. According to the invention, the essence of the hole size sensing member is that it cooperates with the center hole of the record to be played and assumes one of two different positions depending upon the diameter of said center hole. While other arrangements within the scope of this invention will be apparent, the use of a stepped clamping disc mounted on a clamp arm as the sensing member is preferred where the phonograph being employed is of the type whereby a record is reproduced in a vertical playing position.

In adapting the instant invention for use in conjunction with automatic or home phonographs of the type whereby a record to be played is dropped or placed on a horizontal turntable, a sensing member similar to the disc 24 can be positioned at the center of the turntable and biased upwardly with the circumferential shoulder 27 projecting above the top of said turntable. With such an arrangement, when a 45 r.p.m. record is dropped or placed on the turntable the projecting shoulder 27 will pass through the center hole and the sensing member will not be actuated. However, when a 33⅓ r.p.m. record is dropped or placed on the turntable, the face of the record will bear against the shoulder 27 and cause the sensing member to be moved downwardly to a different position. Again, means would be provided to determine the turntable speed in accordance with the position of the sensing member.

It will be understood that turntable speed can be related to two (or more) positions of the sensing member either mechanically, electro-mechanically, or electrically, depending upon the type of turntable drive being employed. In the foregoing description of a preferred embodiment of our invention, an electrical system was described whereby the speed of the phonograph motor was varied by varying the frequency of the power source. With a turntable gear drive arrangement, a gear shifting system may be employed whereby a change of position of the sizing member is utilized to shift a gear in the turntable drive. Similarly, with a rim drive arrangement where a rubber-tired idler wheel is employed to engage both motor shaft and the rim of the turntable, a mechanical system for shifting the idler wheel to engage the motor shaft at a different diameter thereof may be operated in accordance with the position of the sensing member. And, of course, the sensing member may be employed to actuate a solenoid which in turn is used to operate a shifting system.

This invention can, of course, be applied in various ways and the present description should, therefore, be regarded as disclosing only an illustrative embodiment of the invention from which no unnecessary limitations should be implied.

We claim:

1. In an automatic phonograph having a magazine for carrying an intermixture of records with center holes of different diameters adapted, respectively, to be played at different speeds, a turntable on which the records are played and record transfer mechanism: an automatic speed control mechanism comprising a clamp arm for clamping a selected record in playing position on the turntable; a hole-size sensing member mounted on said clamp arm so as to cooperate with the center hole of a record in playing position, said sensing member having a projecting portion of such form and size as to pass through the center hole of a selected record having a large-diameter hole therein when said record is clamped to the turntable but being too large to pass through the center hole of a selected record having a small-diameter hole therein and being thus adapted to engage and be obstructed by the central portion of a record of the latter type; means for biasing said clamp arm towards a selected record positioned on the turntable, whereby said arm will be arrested in one clamping position when a record having a large-diameter center hole is clamped to the turntable and in another clamping position when a record having a small-diameter center hole is clamped to the turntable; and means responsive to the position of said arm for causing the turntable to be driven at a different speed for each clamping position of said arm.

2. In an automatic phonograph having a magazine for carrying an intermixture of records with center holes of two different diameters adapted, respectively, to be played at different speeds, a turntable on which the records are played and record transfer mechanism: an automatic speed control mechanism comprising a clamp arm for clamping a selected record in playing position on the turntable; a hole-size sensing member mounted on said clamp arm so as to cooperate with the center hole of a record in playing position, said sensing member having a projecting circumferential shoulder thereon of a diameter slightly less than the larger of said two center hole diameters so as to pass through the center hole and serve as a spindle for a selected record having a large-diameter hole therein when said record is clamped to the turntable but being too large to pass through the center hole of a selected record having a small-diameter hole therein and being thus adapted to engage and be obstructed by the central portion of a record of the latter type, said shoulder having a concentric center pin projecting therefrom of a diameter slightly less than the smaller of said two center hole diameters so as to pass through the center hole and serve as a spindle for a selected record having a small-diameter hole therein when said record is clamped to the turntable; means for biasing said clamp arm towards a selected record positioned on the turntable, whereby said arm will be arrested in one clamping position when a record having a large-diameter center hole is clamped to the turntable and in another clamping position when a record having a small-diameter center hole is clamped to the turntable; and means responsive to the position of said arm for causing the turntable to be driven at a different speed for each clamping position of said arm.

3. In an automatic phonograph having a magazine for carrying an intermixture of records with center holes of two different diameters adapted, respectively, to be played at different speeds, a turntable on which the records are played and record transfer mechanism: an automatic speed control mechanism comprising a pivotally mounted clamp arm for clamping a selected record in playing position on the turntable; a stepped clamp disc mounted on said clamp arm so as to cooperate with the center hole of a record in playing position and having inner and outer circumferential record engaging surfaces thereon, the inner one comprising a projecting circumferential shoulder having a diameter slightly less than the larger of said two center hole diameters so as to pass through the center hole and serve as spindle for a selected record having a large-diameter hole therein whereby such a record is clamped to the turntable by the outer record engaging surface, but said shoulder being too large to pass through the center hole of a selected record having a small-diameter hole therein and being thus adapted to engage and be obstructed by the central portion of a record of the latter type so as to clamp such a record to the turntable; a center pin of a diameter slightly less than the smaller of said two center hole diameters mounted centrally on said clamping disc so as to pass through the center hole and serve as a spindle for a selected record having a small-diameter hole therein when said record is clamped to the turntable; means including a tension spring for biasing said clamping arm towards a selected record positioned on the turntable, whereby said arm will be arrested in one clamping position when a record having a large-diameter center hole is clamped to the turntable and in another clamping position when a record having a small-diameter center hole is clamped to the turntable; and means responsive to the position of said arm for causing the turntable to be driven at a different speed for each clamping position of said arm.

4. In an automatic phonograph having a magazine for carrying an intermixture of records with center holes of different diameters adapted, respectively, to be played at two different speeds, a turntable on which the records are played, record transfer mechanism and an electric motor for driving the turntable: an automatic speed control mechanism comprising a hole-size sensing member having a projecting portion of such form and size as to pass through the center hole of a selected record having a large-diameter hole therein when said record is positioned on the turntable but being too large to pass through the center hole of a selected record having a small-diameter hole therein and being thus adapted to engage and be obstructed by the central portion of a record of the latter type; means for biasing said sensing member towards the center of a selected record positioned on the turntable, whereby said member will be arrested in one position when a record having a large-diameter center hole is on the turntable and in another position when a record having a small-diameter center hole is on the turntable; two sources of power for said motor of different frequencies arranged to correspond to said two different speeds; switching means for connecting said motor to either of said sources of power; relay means for operating said switching means; a third source of power for actuating said relay means; and a relay circuit having a speed control switch therein for connecting said third source of power to said relay means, said control switch being arranged to be actuated according to the position of said sensing member whereby said motor will be connected to a particular one of said two sources of power in accordance with the position of said sensing member.

5. In an automatic phonograph having a magazine for carrying an intermixture of records with center holes of different diameters adapted, respectively, to be played at two different speeds, a turntable on which the records are played, record transfer mechanism and an electric motor for driving the turntable: an automatic speed control mechanism comprising a clamp arm for clamping a selected record in playing position on the turntable; a hole-size sensing member mounted on said clamp arm so as to cooperate with the center hole of a record in playing position, said sensing member having a projecting portion of such form and size as to passs through the center hole of a selected record having a large-diameter hole therein when said record is clamped to the turntable but being too large to pass through the center hole of a selected record having a small-diameter hole therein and being thus adapted to engage and be obstructed by the central portion of a record of the latter type; means for biasing said clamp arm towards a selected record positioned on the turntable, whereby said arm will be arrested in one clamping position when a record having a large-diameter center hole is clamped to the turntable and in another clamping position when a record having a small-diameter center hole is clamped to the turntable; two sources of power for said motor of different frequencies arranged to correspond to said two different speeds; switching means for connecting said motor to either of said sources of power; relay means for operating said switching means; a third source of power for actuating said relay means; and a relay circuit having a speed control switch therein for connecting said third source of power to said relay means, said control switch being arranged to be actuated according to the position of said clamp arm whereby said motor will be connected to a particular one of said two sources of power in accordance with the clamping position of said clamp arm.

6. In an automatic phonograph having a magazine for carrying an intermixture of records with center holes of different diameters adapted, respectively, to be played at two different speeds, a turntable on which the records are played, record transfer mechanism and an electric motor for driving the turntable: an automatic speed control mechanism comprising a hole-size sensing member having a projecting portion of such form and size as to pass through the center hole of a selected record having a large-diameter hole therein when said record is positioned on the turntable but being too large to pass through the center hole of a selected record having a small-diameter hole therein and being thus adapted to engage and be obstructed by the central portion of a record of the latter type; means for biasing said sensing member towards the center of a selected record positioned on the turntable, whereby said member will be arrested in one position when a record having a large-diameter center hole is on the turntable and in another position when a record having a small-diameter center hole is on the turntable; two sources of power for said motor for different frequencies arranged to correspond to said two different speeds; switching means for connecting said motor to either of said sources of power; relay means for operating said switching means; a third source of power for actuating said relay means; a relay circuit having a speed control switch therein for connecting said third source of power to said relay means, said speed control switch being arranged to be actuated according to the position of said sensing member whereby said motor will be connected to a particular one of said two sources of power in accordance with the position of said sensing member; and means including a second switch positioned in said relay circuit for causing said motor to be connected to a predetermined one of said two sources of power whenever said phonograph is in its change cycle.

7. In an automatic phonograph having a magazine for carrying an intermixture of records with center holes of different diameters adapted, respectively, to be played at different speeds, a turntable on which the records are played, record transfer mechanism and an electric motor for driving the turntable: an automatic speed control mechanism comprising a movable hole-size sensing member biased toward a record on the turntable and positioned so as to extend through the center hole of a selected record of the type having a large-diameter hole therein but so as to be obstructed by the central portion of a selected record having a small-diameter hole therein, such member being thus adapted to be disposed in one operative position when a record of one of said types is positioned on the turntable and in another operative position when a record of the other type is positioned thereon; two sources of power for said motor of different frequencies arranged to correspond to said two different speeds; and connecting means for connecting said motor to either of said sources of power, said connecting means being arranged to be actuated by said sensing member whereby said motor will be connected to a particular one of said two sources of power in accordance with the operative position of said sensing member.

8. An automatic speed control mechanism of the type set forth in claim 7 comprising a pivotally mounted clamp arm for clamping a selected record in playing position on the turntable, said hole-size sensing member being mounted on said clamp arm so as to cooperate with the center hole of a record in playing position; means for biasing said clamp arm towards a selected record positioned on the turntable whereby said arm will be arrested in one clamping position when a record having a large-diameter center hole is clamped to the turntable and in another clamping position when a record having a small-diameter center hole is clamped to the turntable; and means carried by said clamp arm for actuating said connecting means whereby said motor will be connected to a particular one of said two sources of power in accordance with the clamping position of said arm.

9. An automatic speed control mechanism of the type set forth in claim 4 wherein a second switch is provided in said relay circuit for causing said motor to be connected to a predetermined one of said two sources of power independently of the position of said sensing means, and wherein means are provided for actuating said second switch whenever said phonograph is in its change cycle.

10. In an automatic phonograph having a magazine for carrying an intermixture of records with center holes of different diameters adapted, respectively, to be played at different speeds, a turntable on which the records are played, record transfer mechanism and an electric motor for driving the turntable: an automatic speed control mechanism comprising a pivotally mounted clamp arm for clamping a selected record in playing position on the turntable; a hole-size sensing member mounted on said clamp arm and positioned so as to extend through the center hole of a selected record of the type having a large-diameter hole therein when said record is clamped to the turntable but so as to be obstructed by the central portion of a selected record having a small-diameter hole therein; means for biasing said clamp arm towards a selected record positioned on the turntable whereby said arm will be arrested in one clamping position when a record having a large-diameter center hole is clamped to the turntable and in another clamping position when a record having a small-diameter center hole is clamped to the turntable; two sources of power for said motor of different frequencies arranged to correspond to said two different speeds; switching means for connecting said motor to either of said sources of power; relay means for operating said switching means; a third source of power for actuating said relay means; a relay circuit having a speed control switch therein for connecting said third source of power to said relay means, said speed control switch being arranged to be actuated according to the clamping position of said arm; a second switch in said relay circuit for causing said motor to be connected to a predetermined one of said two sources of power independently of the position of said clamp arm; and means for actuating the second switch in said relay circuit whenever said phonograph is in its change cycle.

11. An automatic speed control mechanism of the type set forth in claim 1 wherein said hole-size sensing member is carried on one end of a mounting pin by means of a universal ball joint, said pin also having a ball-shaped extension at its other end which is connected to said clamping arm by a second universal joint.

References Cited in the file of this patent

UNITED STATES PATENTS

| | | |
|---|---|---|
| 2,563,426 | Steinmetz | July 7, 1896 |
| 2,673,089 | Osborne | Mar. 23, 1954 |
| 2,943,861 | Redfield | July 5, 1960 |
| 2,946,594 | Staar | July 26, 1960 |